(12) United States Patent
Florea et al.

(10) Patent No.: US 11,498,660 B2
(45) Date of Patent: Nov. 15, 2022

(54) EMBEDDED ENGINES IN HYBRID BLENDED WING BODY

(71) Applicant: UNITED TECHNOLOGIES CORPORATION, Farmington, CT (US)

(72) Inventors: Razvan Virgil Florea, Manchester, CT (US); William T. Cousins, Glastonbury, CT (US); Thomas G. Tillman, West Hartford, CT (US); David J. Arend, Cleveland, OH (US); John D. Wolter, Cleveland, OH (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 515 days.

(21) Appl. No.: 16/167,968

(22) Filed: Oct. 23, 2018

(65) Prior Publication Data
US 2019/0055006 A1 Feb. 21, 2019

Related U.S. Application Data

(62) Division of application No. 14/203,735, filed on Mar. 11, 2014, now abandoned.
(Continued)

(51) Int. Cl.
*B64C 21/04* (2006.01)
*B64D 29/04* (2006.01)
(Continued)

(52) U.S. Cl.
CPC ............ *B64C 21/04* (2013.01); *B64C 21/025* (2013.01); *B64C 21/08* (2013.01); *B64D 27/20* (2013.01);
(Continued)

(58) Field of Classification Search
CPC ....... B64C 21/04; B64C 21/08; B64C 21/025; B64D 27/20; B64D 29/04
See application file for complete search history.

(56) References Cited

U.S. PATENT DOCUMENTS 4,199,295 A 4/1980 Raffy et al.
5,303,879 A 4/1994 Bucher
(Continued)

FOREIGN PATENT DOCUMENTS

GB 851379 * 10/1957

OTHER PUBLICATIONS

Mattingly, Jack D., et al. "Aircraft Engine Design," Second Edication, AIAA Education Series, J.S. Prezemieniecki, Series Editor-in-Chief, AIAA 2002. Extract from: Google Books, https://books.google.com/books?id=2Wy5rpdm3DMC&printsec=frontcover#v=onepage&q&f=false, accessed Jun. 10, 2016.
(Continued)

*Primary Examiner* — Jessica B Wong
(74) *Attorney, Agent, or Firm* — Carlson, Gaskey & Olds, P.C.

(57) ABSTRACT

A hybrid wing aircraft has an engine embedded into a body of the hybrid wing aircraft. The embedded engine has a fan that is received within a nacelle. The body of the aircraft provides a boundary layer over a circumferential portion of a fan. A system delivers additional air to correct fan stability issues raised by the boundary layer.

17 Claims, 2 Drawing Sheets

Related U.S. Application Data

(60) Provisional application No. 61/775,980, filed on Mar. 11, 2013.

(51) Int. Cl.
  *B64C 21/02* (2006.01)
  *B64C 21/08* (2006.01)
  *B64D 27/20* (2006.01)
  *B64C 39/10* (2006.01)
  *B64C 1/16* (2006.01)
  *B64D 33/02* (2006.01)

(52) U.S. Cl.
  CPC ............. *B64D 29/04* (2013.01); *B64C 1/16* (2013.01); *B64C 39/10* (2013.01); *B64C 2039/105* (2013.01); *B64C 2230/04* (2013.01); *B64D 33/02* (2013.01); *B64D 2033/0226* (2013.01); *B64D 2033/0253* (2013.01); *Y02T 50/10* (2013.01)

(56) References Cited

U.S. PATENT DOCUMENTS

| | | | |
|---|---|---|---|
| 5,447,283 A | 9/1995 | Tindell | |
| 5,732,547 A | 3/1998 | Olsen et al. | |
| 6,381,950 B1 | 5/2002 | Whaites et al. | |
| 7,631,483 B2 | 12/2009 | Mani et al. | |
| 7,878,759 B2 | 2/2011 | Mills et al. | |
| 8,038,091 B2 | 10/2011 | Ishiba | |
| 8,082,726 B2 | 12/2011 | Cloft | |
| 8,141,366 B2 | 3/2012 | Zamora et al. | |
| 8,181,441 B2 | 5/2012 | Smith | |
| 8,191,820 B1 | 6/2012 | Westra et al. | |
| 8,192,147 B2 | 6/2012 | Haas | |
| 8,205,432 B2 | 6/2012 | Sheridan | |
| 2003/0213870 A1 | 11/2003 | Eakins et al. | |
| 2006/0022092 A1 | 2/2006 | Miller et al. | |
| 2006/0032988 A1 | 2/2006 | Webster | |
| 2006/0102801 A1* | 5/2006 | Manley | B64C 21/04 244/208 |
| 2008/0112799 A1 | 5/2008 | Winter et al. | |
| 2010/0108802 A1 | 5/2010 | Marche et al. | |
| 2010/0270433 A1* | 10/2010 | Miller | B64C 21/04 244/204 |
| 2013/0192241 A1 | 8/2013 | Blackwell et al. | |

OTHER PUBLICATIONS airforce-technology.com, B-2 Spirit Stealth Bomber, http://www.airforce-technology.com/projects/b2/; archived by Internet Archive on Apr. 11, 2005, https://web.archive.org/web/20050411160439/http://www.airforce-technology.com/project_printable.asp?ProjectID=1088, accessed Jun. 9, 2016.

* cited by examiner

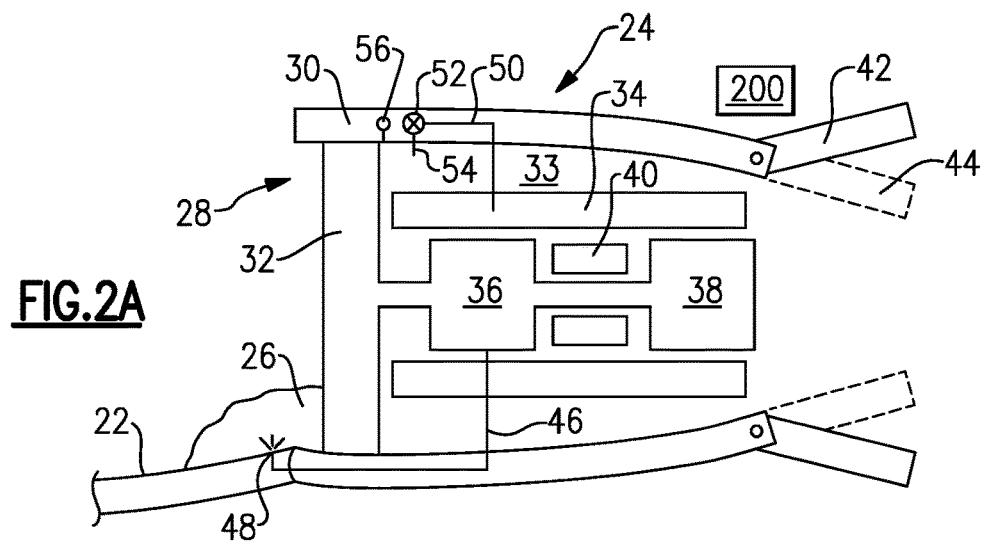
FIG.2A
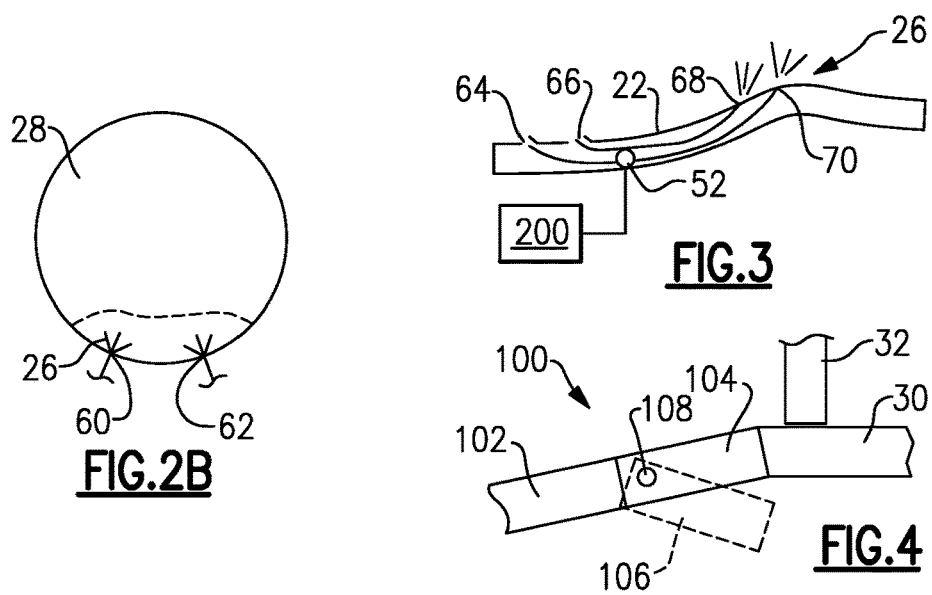
FIG.2B
FIG.3
FIG.4
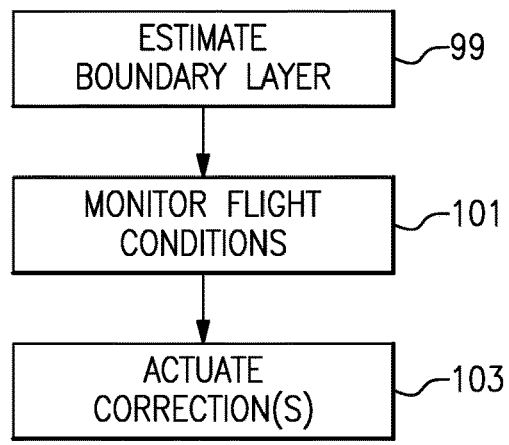
FIG.5

EMBEDDED ENGINES IN HYBRID BLENDED WING BODY

CROSS-REFERENCE TO RELATED APPLICATION

This application is a divisional of U.S. application Ser. No. 14/203,735, filed Mar. 11, 2014, which claims priority to U.S. Provisional Application No. 61/775,980, filed Mar. 11, 2013.

STATEMENT REGARDING FEDERALLY SPONSORED RESEARCH OR DEVELOPMENT

This invention was made with government support under contract number NNC07CB59C awarded by NASA. The government has certain rights in the invention.

BACKGROUND OF THE INVENTION

This application relates to a method of controlling airflow to a fan for an embedded gas turbine engine in a hybrid wing aircraft body.

Gas turbine engines are known and, typically, include a fan delivering air into a compressor. The air is compressed and delivered into a combustion section where it is mixed with fuel and ignited. Products of this combustion pass downstream over turbine rotors driving them to rotate.

Much effort is required to ensure the airflow reaching the fan is generally uniform across a circumference of the fan. Historically, engines have been mounted on a tail of the aircraft or, even more typically, beneath the wings of an aircraft.

However, the next generation of air vehicles seeks to provide dramatic reduction in noise, emissions and fuel burn. One path to achieve this is to design an aircraft to have a hybrid wing body in which there is little distinction between the location of where a wing begins and the fuselage or body ends.

Engines are embedded within this hybrid body. Thus, the engine will typically have a portion of the body at one side of a nacelle, or housing surrounding the fan, but aircraft body at an opposed side of the nacelle. This can result in a non-uniform flow approaching the fan, as there is distortion or boundary layer challenges at a vertical portion of the fan which is in contact with the aircraft's body.

SUMMARY OF THE INVENTION

In a featured embodiment, a hybrid wing aircraft has an engine embedded into a body of the aircraft, such that the embedded engine has a fan received within a nacelle. The body provides a boundary layer over a circumferential portion of a circumference of the fan. There is a system to deliver additional air to correct fan stability issues raised by the boundary layer.

These and other features may be best understood from the following drawings and specification.

BRIEF DESCRIPTION OF THE DRAWINGS

FIG. 2A schematically shows features of this application.
FIG. 2B shows an alternative embodiment.
FIG. 3 shows other alternatives.
FIG. 4 shows yet another alternative.
FIG. 5 is a flowchart of the method of this application.

DETAILED DESCRIPTION

Figure 1:
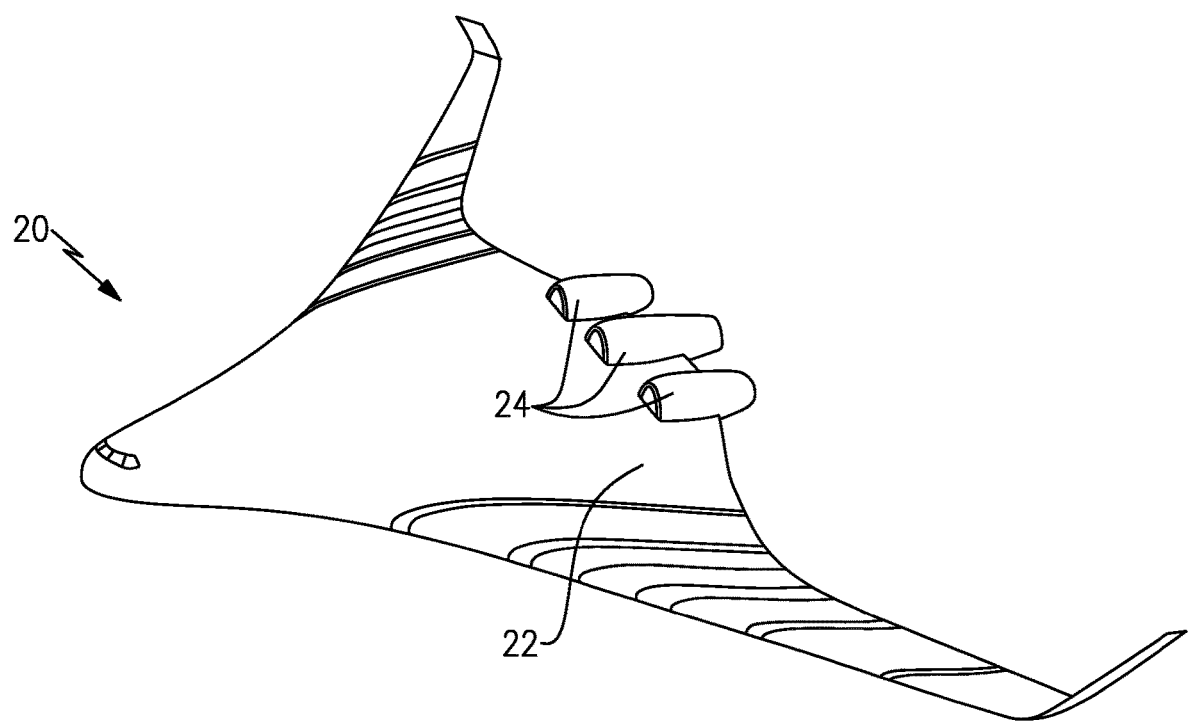
FIG. 1 shows a hybrid wing aircraft and proposed locations for embedded engines.

A hybrid wing aircraft 20 is illustrated in FIG. 1, having a hybrid body 22. Engines 24 are shown embedded into the body 22. As can be appreciated from FIG. 2A, the airflow reaching a vertically upper location 28 of a fan 32 of the engine 24 has less resistance to flow than does the air at a location directly downstream of the body 22. As shown, a boundary layer effect 26 will occur at that location.

As known, the fan 32 will deliver air into a bypass duct 33 where it becomes propulsion for the aircraft 20, and some air will be delivered to a compressor rotor 36. A nacelle 30 is positioned outwardly of a core engine housing 34. This air will pass into a combustor 40, and the products of combustion will pass downstream over a turbine rotor 38 driving it to rotate. The turbine rotor 38 drives the compressor rotor 36 and fan 32. As can be appreciated by a worker in this art, this is a very simplified description of the gas turbine engine and there may be several separate rotors in the compressor and turbine section, and there may be a gear reduction driving the fan 32, such that the fan can rotate at slower speeds. The teachings of this application will apply to any such gas turbine engine associated with an aircraft.

The boundary layer 26 causes challenges at the fan and, in particular, raises stability issues.

The present invention utilizes modern engine modeling technology to model the boundary layer that will occur under any number of flight conditions that the aircraft 20 will face. Generally, the boundary layer will result in the injection of low momentum air, compared to the air outside of the boundary layer. As a first step, the amount of boundary layer injected low momentum air is estimated. This can be based on predictions of aircraft maneuvering flow conditions, or direct flow measurements in a test facility once the aircraft and gas turbine engine have been designed. A simple inlet total pressure sensor may be mounted upstream of an inlet to the fan 32, and can be calibrated and mapped to aircraft distortion conditions. The map may be used to detect stability threats during various conditions of aircraft operation, and may also be developed during wind tunnel testing. These estimates may be provided to a control 200, and may be stored as a table within the control 200. Control 200 may be a full authority digital electronic control, such as are typically utilized to control gas turbine engines today.

Once the amount of boundary layer injected low momentum flow is known, corrective steps can be taken.

As an example, a tap 46 is shown in FIG. 2A tapping air from the compressor rotor 36 to an outlet 48 in the body 22 immediately upstream of the fan 32. By tapping air to outlet 48 and delivering it into the boundary layer 26, the problematic effects of the low momentum flow can be overcome by injecting higher momentum flow.

On the other hand, stability can also be addressed by tapping air 50 from the compressor rotor 36 to a valve 52 and to an outlet 54 downstream of the fan 32. By injecting air at the opposed side of the fan 32 from the boundary layer 26, the injection will drive air downwardly to the location of the boundary layer 26. This may also diminish the problems associated with the boundary layer.

Control 200 may control the valve 52 based upon the mapping. Further, a sensor, such as sensor 56, may sense conditions downstream of the fan 32 and communicate with the control 200 to provide information when there are challenges to fan stability.

In addition, a variable area fan nozzle 42 may be moveable to restrict flow at position 44. The variable area fan nozzle 42 may be provided as a high-band rapidly moveable nozzle to move a fan operating line away from a stall when a reduced stability margin is detected. When stall is a concern, the variable area fan nozzle 42 may be moved to a more open position, such as away from the phantom line position 44 to move the fan 32 away from a stall condition.

As shown in FIG. 2B, injection upstream of the fan 32 may occur at circumferentially locations 60 and 62. Of course, more than two injection points may be utilized.

FIG. 3 shows an alternative wherein there are taps 64 and 66, which are formed on the body 22 and which act as inlets to deliver additional air to outlet 68 and 70 in the boundary layer 26. All of these solutions can be utilized in combination or can be used separately.

FIG. 4 shows another alternative 100, which would only be utilized under extreme conditions. As shown, the aircraft body 102 has a pivoting door 104 which can pivot about pivot point 108 to a removed position 106. At removed position 106 the effect of the boundary layer approaching the fan 32 will be dramatically reduced. Of course, the aerodynamic flow along the aircraft body 102 will also be dramatically reduced and, thus, the movement to the position 106 may only be desired during extreme conditions.

As shown in FIG. 5, a basic flow chart for this application includes the initial step of estimating a boundary layer at 99. This will include estimating the amount of injected low momentum flow during any number of flight conditions and storing findings.

At 101, the method monitors flight conditions for the hybrid wing aircraft 20. At step 103, corrective actions are actuated in response to the monitored flight condition along with the estimated boundary layers that will exist during those flight conditions.

The control can also be passive, such as the taps 46 or 64 and 66, which do not include valves. On the other hand, any of the disclosed taps can be provided with the valve which are controlled by the control 200.

Listing of Potential Embodiments. The following are non-exclusive descriptions of possible embodiments of the present invention.

In a featured embodiment, a hybrid wing aircraft has an engine embedded into a body of the aircraft, such that the embedded engine has a fan received within a nacelle. The body provides a boundary layer over a circumferential portion of a circumference of the fan. There is a system to deliver additional air to correct fan stability issues raised by the boundary layer.

In another embodiment according to the previous embodiment, the system includes a tap providing additional airflow into the location of the boundary layer upstream of the fan.

In another embodiment according to any of the previous embodiments, the tap includes a tap from a compressor which is downstream of the fan.

In another embodiment according to any of the previous embodiments, the tap includes a tap in the body and further upstream of the fan than an outlet of the tap, such that the tap provides additional airflow into the boundary layer.

In another embodiment according to any of the previous embodiments, there are a plurality of axially spaced taps delivering air to a plurality of axially spaced outlets.

In another embodiment according to any of the previous embodiments, there are a plurality of circumferentially spaced outlets.

In another embodiment according to any of the previous embodiments, the system provides additional air to a location downstream of the fan.

In another embodiment according to any of the previous embodiments, the system delivers air into a position downstream of the fan at a location spaced from the circumferential portion of the boundary layer, such that the delivered air drives additional air to the location of the boundary layer.

In another embodiment according to any of the previous embodiments, a valve is controlled to control the amount of additional air delivered.

In another embodiment according to any of the previous embodiments, there is a nozzle on the nacelle downstream of the fan. The nozzle is moveable to address fan conditions when an approaching stall condition may be detected.

In another embodiment according to any of the previous embodiments, the variable area nozzle is moved to a more open position when stall is detected.

In another embodiment according to any of the previous embodiments, a moveable portion of the body is positioned upstream of the fan and may be moved away from a rotational envelope of the fan to minimize the boundary layer under certain conditions.

In another embodiment according to any of the previous embodiments, an estimate of the boundary layer conditions under any number of flight conditions is initially made, and stored with a controller. The controller is operable to control the system to address fan stability issues under various flight conditions.

In another featured embodiment, a method of operating a hybrid wing aircraft including the steps of operating an embedded engine embedded into a body of a hybrid wing aircraft, such that the embedded engine has a fan received within a nacelle. The body provides a boundary layer over a circumferential portion of a circumference of the fan and delivers additional air to correct fan stability issues raised by the boundary layer.

In another embodiment according to the previous embodiment, additional airflow is delivered into the location of the boundary layer upstream of the fan.

In another embodiment according to any of the previous embodiments, the additional air is tapped from a location in the body further upstream of the fan than an outlet of the tap, such that the tap provides additional airflow into the boundary layer.

In another embodiment according to any of the previous embodiments, the additional air is supplied to a location downstream of the fan.

In another embodiment according to any of the previous embodiments, the additional air is delivered into a position downstream of the fan at a location spaced from the circumferential location of the boundary layer, such that the additional air drives air to the location of the boundary layer.

In another embodiment according to any of the previous embodiments, there is a nozzle on the nacelle downstream of the fan. The nozzle is moved to a more open position when stall is detected.

In another embodiment according to any of the previous embodiments, a moveable portion of the body is positioned upstream of the fan and moved away from a rotational envelope of the fan to minimize the boundary layer under certain conditions.

In another embodiment according to any of the previous embodiments, an estimate of the boundary layer conditions under any number of flight conditions is initially made, and stored with a controller. The controller is operable to control the system to address potential stall under various flight conditions.

Although embodiments of this invention have been disclosed, a worker of ordinary skill in this art would recognize that certain modifications would come within the scope of this invention. For that reason, the following claims should be studied to determine the true scope and content of this invention.

The invention claimed is:

1. A hybrid wing aircraft comprising:
   an engine embedded into a body of said hybrid wing aircraft, such that said embedded engine has a fan received within a nacelle, and wherein a portion of said body providing a boundary layer over a circumferential portion of a circumference of said fan;
   a system to deliver an additional amount of air to said circumferential portion to reduce the effect of said boundary layer on fan stability;
   wherein said system includes at least one tap with an outlet located upstream of the nacelle, said outlet configured to deliver said additional amount of air to said boundary layer at a location upstream of said nacelle;
   wherein said system further includes an inlet to said tap in said body and further upstream of said fan than an outlet of said tap;
   wherein said tap includes a valve configured to control the delivery said additional amount of air to said boundary layer; and
   a controller storing estimates of said boundary layer conditions under a plurality of flight conditions, and said controller being operable to control said valve to address fan stability issues based upon said stored estimates.

2. The hybrid wing aircraft as set forth in claim 1, wherein said system includes a plurality of taps, said plurality of taps defined by a plurality of outlets upstream of said nacelle and a plurality of inlets further upstream than said outlets.

3. The hybrid wing aircraft as set forth in claim 2, wherein said plurality of inlets are spaced axially apart and said plurality of outlets are spaced axially apart.

4. The hybrid wing aircraft as set forth in claim 2, wherein said plurality of taps are spaced circumferentially on said portion of said body.

5. The hybrid wing aircraft as set forth in claim 1, further comprising a nozzle on said nacelle downstream of said fan, and said nozzle being moveable to address fan conditions when an approaching stall condition may be detected.

6. The hybrid wing aircraft as set forth in claim 5, wherein said nozzle is moved to a more open position when stall is detected.

7. A method of operating a hybrid wing aircraft comprising:
   operating an embedded engine embedded into a body of said hybrid wing aircraft, wherein said embedded engine has a fan received within a nacelle, and wherein a portion of said body providing a boundary layer over a circumferential portion of a circumference of said fan;
   estimating said boundary layer conditions under a plurality of flight conditions initially and storing within a controller;
   delivering an additional amount of air to said circumferential portion to reduce the effect of said boundary layer on fan stability, said controller controlling the amount of air delivered based on said estimation of boundary layer conditions;
   wherein the additional amount of airflow is delivered by at least one tap with an outlet located upstream of the nacelle and an inlet in said body and further upstream of said fan than said outlet.

8. The method as set forth in claim 7, further comprising controlling the amount of air delivered by the at least one tap with a valve.

9. The method as set forth in claim 8, further comprising sensing conditions downstream of the fan and communicating with the controller when the corresponding estimation of boundary layer conditions provides challenges to fan stability.

10. The method as set forth in claim 9, further comprising controlling the valve with the controller to reduce the effects of said boundary layer on fan stability.

11. The method as set forth in claim 9, further comprising positioning a nozzle on said nacelle downstream of said fan, and said nozzle moved to a more open position when challenges to fan stability are detected.

12. The method as set forth in claim 7, further comprising delivering the additional amount of airflow with a plurality of taps, said plurality of taps defined by a plurality of outlets upstream of said nacelle and a plurality of inlets further upstream than said outlets.

13. The method as set forth in claim 12, wherein said plurality of inlets are spaced axially apart and said plurality of outlets are spaced axially apart.

14. The method as set forth in claim 13, wherein said plurality of taps are spaced circumferentially on said portion of said body.

15. The hybrid wing aircraft as set forth in claim 1, wherein said estimates of said boundary layer conditions under said plurality of flight conditions includes an estimates of boundary layer low momentum air delivered to the fan at said plurality of flight conditions.

16. The method as set forth in claim 7, wherein the step of estimating said boundary layer conditions under said plurality of flight conditions includes estimating boundary layer low momentum air delivered to the fan at said plurality of flight conditions.

17. The method as set forth in claim 16, wherein the step of estimating includes taking flow measurements from a sensor mounted upstream of the nacelle.

* * * * *